United States Patent [19]

Mason

[11] Patent Number: 5,174,489
[45] Date of Patent: Dec. 29, 1992

[54] ELECTRICALLY-DRIVEN CAM-ACTUATED TOOL CLAMP

[75] Inventor: Arthur C. Mason, Mt. Clemens, Mich.

[73] Assignee: Utica Enterprises, Inc., Shelby Township, Macomb County, Mich.

[21] Appl. No.: 884,752

[22] Filed: May 18, 1992

[51] Int. Cl.[5] .......................... B25B 5/02; B25B 5/04; B23K 37/04
[52] U.S. Cl. ........................................ 228/18; 228/57; 269/228; 269/232; 269/233; 269/238; 219/86.25; 219/87
[58] Field of Search .................... 228/18, 44.3, 47, 57; 269/228, 232, 233, 238; 219/86.1, 86.23, 86.25, 87, 161

[56] References Cited

U.S. PATENT DOCUMENTS

| | | | |
|---|---|---|---|
| 1,862,149 | 6/1932 | Klatt | 269/232 |
| 2,481,844 | 9/1949 | Johnson | 219/87 |
| 4,229,637 | 10/1980 | Dederer et al. | 219/87 |
| 4,600,095 | 7/1986 | Brems et al. | |
| 4,666,138 | 5/1987 | Dearman | 269/233 |
| 4,887,803 | 12/1989 | Witt | |
| 4,892,623 | 1/1990 | Reed | |
| 4,909,493 | 3/1990 | Yonezawa | |
| 4,934,678 | 6/1990 | Bernier | |
| 4,968,247 | 11/1990 | Olson | |
| 5,005,813 | 4/1991 | Lawrence | |

Primary Examiner—Samuel M. Heinrich
Attorney, Agent, or Firm—Remy J. VanOphem

[57] ABSTRACT

A mechanical clamping device adapted to engage and secure the upper tooling of a welding knee. The clamping device is motor driven such that several clamping devices can be simultaneously and synchronously operated to engage, align and secure the upper tooling from a remote location. The clamping device includes a clamping lever actuated by a cam mechanism. The clamping lever has an upper end provided with a cam follower, a lower engagement end for engaging the tooling, and a journalling region. The engagement end is adapted to closely engage a corresponding feature on the tooling. The journalling region of the clamping lever is slidably journalled in a bushing which includes a biasing member for biasing the cam follower against the cam mechanism. The clamping lever is pivotably attached by the bushing to the cam mechanism which serves to both rotate the clamping lever and bushing together and stroke the clamping lever within the bushing to secure the upper tooling to the welding knee. The cam mechanism rotates the clamping lever during a positioning stage of the clamping device, and then sequentially strokes the clamping lever to engage the engagement end of the clamping lever with the upper tooling during an engagement stage. The cam mechanism is driven by a motor through a worm gear arrangement which is capable of resisting an overrunning condition induced by the weight of the upper tooling on the lever and cam arrangement.

22 Claims, 8 Drawing Sheets 5,174,489

ELECTRICALLY-DRIVEN CAM-ACTUATED TOOL CLAMP

BACKGROUND OF THE INVENTION

1. Field of the Invention

The present invention generally relates to clamping devices. More specifically, this invention relates to a tool clamping device adapted for engaging, clamping and supporting tooling in a manner that promotes automated tooling changes on a manufacturing production line.

2. Description of the Prior Art

Mechanical welding presses, or "welding knees", are commonly used on automated production assembly lines where multiple welds are necessary to join high volume subassemblies, such as automotive doors and hoods. Conventionally, as illustrated in U.S. Pat. No. 4,600,095 to Brems et al, a welding knee includes a very large machine frame having a lower movable platen, or table, and an upper workstation. The table is actuated vertically by specially designed straight-line lift linkages which are typically driven by a motion generating device powered by a reversible electric motor. The use of a generating device powered by an electric motor provides that the table is raised rapidly during an initial phase, then slows the table's rate of ascent during an intermediate phase, and again rapidly raises the table through a final stage in which the table becomes positioned immediately below the upper workstation. Brems et al illustrate these stages in FIGS. 1 through 4. During the intermediate stage, the table lifts a workpiece from a conveyor and raises it toward the upper workstation for the welding operation. It is not uncommon for the entire ascent of the table to cover approximately twenty inches of travel in one to two seconds.

The table is provided with lower tooling which is adapted to mate with upper tooling suspended from the upper workstation. The upper and lower tooling are designed to receive the workpiece in a manner that maintains the proper location of the components of the welded assembly prior to welding. The upper tooling includes welding guns which perform the welding operation. The number of welding guns will vary with the particular component being assembled, with as many as twenty welding guns being typical.

Each particular component being welded requires its own specific upper and lower tooling, therefore, tooling changes are a necessity in order that a machine such as the welding knee be fully utilized and versatile. In that the weight of the upper tooling can be considerable—with ten thousand pounds not being uncommon—precautions must be taken during a tooling change to ensure that the upper tooling is securely engaged and supported from the upper workstation, as well as being properly located on the upper workstation for alignment with the lower tooling. In the prior art, it has been the general practice to secure both the upper and lower tooling with bolts and other conventional fasteners directly to the respective table and upper workstation. While being adequate in terms of structural support, particular care must be used in raising the upper tooling into location below the upper workstation to properly position the upper tooling. Once in position, it can be extremely hazardous for the operator to secure the upper tooling in the conventional manner in that he or she must perform this task while the upper tooling is being positioned with a temporary support.

Accordingly, it would be far preferable to provide an automated mechanism, such as a specially adapted clamping device, to secure the upper tooling to the upper workstation. Clamping devices adapted for various operations are widely taught in the relevant art. As examples, U.S. Pat. No. 4,909,493 to Yonezawa teaches a hydraulically-actuated clamp cylinder for clamping a member that circumscribes the clamping cylinder; U.S. Pat. No. 4,892,623 to Reed teaches a solenoid-driven clamping device for clamping a cylindrical member; and U.S. Pat. No. 4,887,803 to Witt, U.S. Pat. No. 4,934,678 to Bernier, U.S. Pat. No. 4,968,247 to Olson and U.S. Pat. No. 5,005,813 to Lawrence teach clamping devices which are cam actuated. However, none of the clamping devices taught by the prior art are suitable for engaging and securing the upper tooling of a machine to the machine's upper workstation.

As can be readily appreciated by those skilled in the art, the above examples would require, at minimum, substantial modifications in order to be suitable for engaging and securing the upper tooling of a machine and particularly a welding knee. Even where possible, the durability and manner in which the clamping devices of the prior art operate would make the clampling devices unsuitable for use on an automated production assembly line where supporting 10,000 pounds presents a considerable safety concern.

In addition, it is generally preferable that the clamping device chosen for such a purpose be adapted to engage the upper tooling and properly align the upper tooling with the lower tooling during the clamping operation. This would allow the operator to place the upper tooling in the vicinity of the preferred clamping device, with the clamping device itself making the final movement which brings the upper tooling in alignment with the lower tooling.

From the above discussion, it can be readily appreciated that the prior art does not disclose a clamping device suitable for engaging and securing the upper tooling of a machine at its upper workstation. Nor does the prior art teach or suggest a clamping device which is adapted to be operated in an automated manner on a production assembly line to minimize the labor and time involved in changing the upper tooling.

Accordingly, what is needed is a motor-driven mechanical clamping device which is capable of engaging and lifting the upper tooling from a transport device and clamping the upper tooling in alignment with the lower tooling of a workstation in a manner which minimizes the labor and time required to install and remove the upper tooling, while also providing a clamping mechanism that will reliably secure and support the upper tooling throughout a production run.

SUMMARY OF THE INVENTION

According to the present invention there is provided a mechanical clamping device adapted to engage and secure the upper tooling of a work performing machine. The clamping device is sufficiently compact as to be capable of being housed within the upper workstation of the machine. From this advantageous location, the clamping device is able to engage and secure the upper tooling without the active participation of an operator to manually fasten the upper tooling to the upper workstation. The clamping device is motor driven such that several clamping devices can be simultaneously and synchronously operated to engage, align and secure the upper tooling from a remote location. In addition, the clamping device operates mechanically and incorporates several safety features which lock the clamping mechanism in place to prevent the clamping device from being disengaged from the upper tooling.

The clamping device includes a clamping lever which is preferably actuated by a cam mechanism. The clamping lever has an upper end provided with a cam follower, a lower engagement end for engaging the tooling, and an intermediate journalling region. The engagement end is adapted to closely engage a corresponding feature on the tooling, such as a T-shaped end for engaging a T-slot in the upper surface of the tooling. The intermediate journalling region of the clamping lever is slidably journalled in a bushing which includes a biasing member for biasing the clamping lever in a downward direction toward the tooling.

The clamping lever is pivotably attached by the bushing to a camming member which serves to both rotate the clamping lever and bushing together and stroke the clamping lever within the bushing. The camming member rotates the clamping lever from a nearly horizontal position to a nearly vertical position during a positioning stage of the clamping device, and then sequentially strokes the clamping lever along its longitudinal axis to engage the engagement end of the clamping lever with the upper tooling during an engagement stage. The biasing member maintains the clamping lever in an extended position during the positioning stage to enable the engagement end of the clamping lever to freely engage the corresponding feature provided in the upper tooling.

The camming member is driven by a motor, preferably through a worm gear arrangement which is capable of resisting an overrunning condition induced by the weight of the upper tooling on the lever and cam arrangement. The worm gear arrangement is sized to reduce the rate at which the clamping lever is stroked to better control the engaging and securing movement of the clamping device.

According to a preferred aspect of this invention, one or more clamping devices can be mounted directly to the upper workstation of a machine so as to be in position to engage and secure the selected upper tooling for a particular production run. After lifting the upper tooling toward the upper workstation in a conventional manner, such as with a fork lift or conveyor, the clamping devices can be synchronously operated to engage the upper tooling in a manner that both minimizes the manpower required to secure the upper tooling in place while also greatly improving the safety of such an operation.

Moreover, the clamping devices can be positioned to accurately engage and lift the upper tooling into a secured position in an upper work station that is properly aligned with the lower tooling of a work station lower table. The engagement features of both the clamping lever and the upper tooling can be designed such that, as the clamping lever is rotated into position, the engagement end of the clamping lever positively engages the corresponding feature of the upper tooling which serves as a datum for locating the upper tooling with the lower tooling.

In addition, a significant advantage of the present invention is that the camming member can be motor driven to provide precise control of each clamping lever in a sequential or simultaneous manner. With suitable control circuitry, each motor can be equipped to detect the position of its respective clamping lever to ensure its proper operation and engagement with the upper tooling. As a result, safety features such as emergency overrides and stops can be provided to prevent or detect dangerous conditions such as a damaged or disengaged clamping lever.

Accordingly, it is an object of the present invention to provide a clamping device for engaging and securing the upper tooling of an upper work station of a machine.

It is a further object of the invention that the clamping device provide a clamping lever which is able to be moved into position and actuated to engage and clamp the upper tooling to the upper workstation of the machine.

It is still a further object of the invention that the clamping device include a camming or linkage assembly which both pivotably rotates the clamping lever into position and strokes the clamping lever to positively engage and clamp the upper tooling to the upper work station of a machine.

It is another object of the invention that the clamping device be capable of accurately positioning the upper tooling relative to the lower tooling of the machine.

It is yet another object of the invention that the camming or linkage assembly be motor driven so as to provide automated remote control of the clamping device during the installation of the upper tooling.

It is still another object of the invention that the clamping device provide safety features that secure the upper tooling to the machine and detect improper engagement of the clamping device with the upper tooling.

Other objects and advantages of this invention will be more apparent after a reading of the following detailed description taken in conjunction with the drawings provided.

DETAILED DESCRIPTION OF THE PREFERRED EMBODIMENT

For the purpose of clearly disclosing the insertion, the invention is disclosed as used in a welding knee. It will be apparent to one skilled in the art that the clamping device may be used to secure the upper tooling of any machine to the upper work station of any machine.

Figure 1:
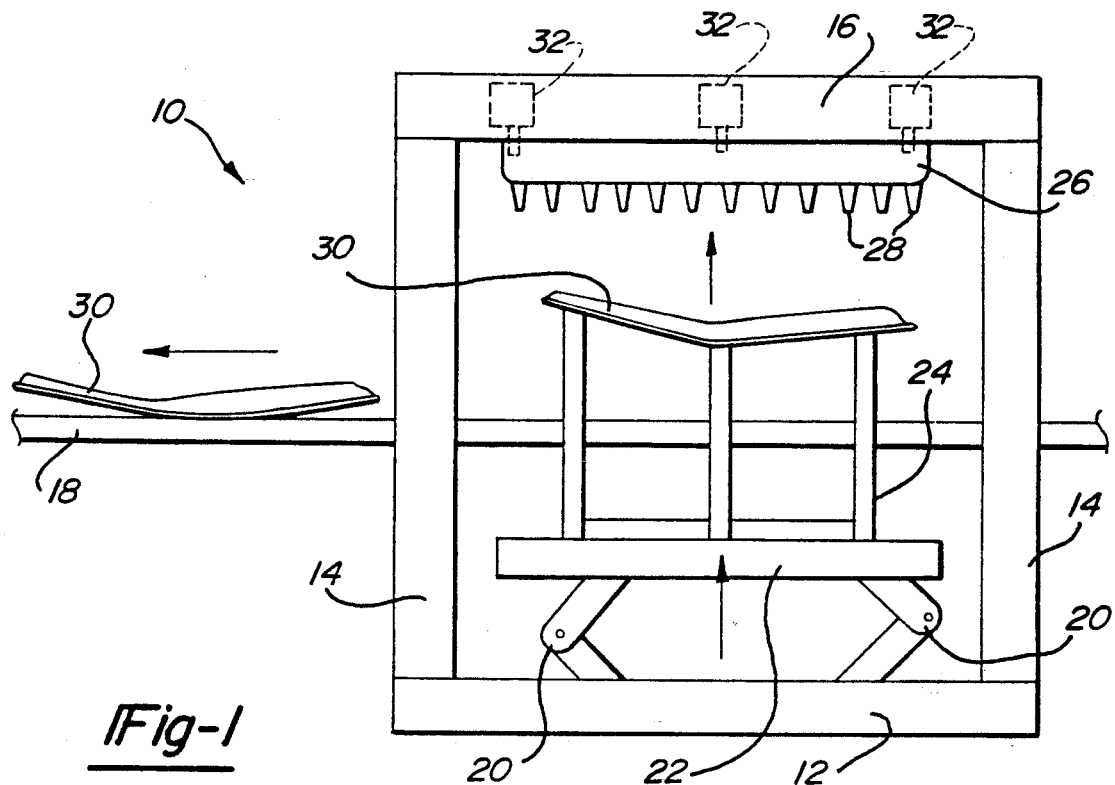
FIG. 1 is a front view of a welding knee which employs the clamping device of the present invention.

With reference to FIG. 1, there is shown a typical mechanical welding press, or welding knee 10, in which a clamping device 32 of the present invention is employed. The illustrated welding knee 10 is known to the art and is shown only to convey a better understanding of the present invention. Accordingly, the teachings of the present invention are not limited to the welding knee 10 described below and shown in FIG. 1.

The welding knee 10 includes a lower support base 12, an upright support structure 14 which typically includes four or more upright members, and an upper workstation 16 which is supported above the lower support base 12 by the upright support structure 14. The upper workstation 16 is adapted to receive an upper tooling 26 which includes a number of welding guns 28 disposed thereon depending on the type of workpieces being process. As a matter of convenience, the transformers (not shown) for the welding guns 28 can be housed within the upper workstation 16. As will be explained more fully below, the upper tooling 26 is clamped to the underside of the upper workstation 16 by the clamping device 32 of the present invention. Accordingly, the structural strength of the welding knee 10 must be sufficient to support the weight of the upper workstation 16, the upper tooling 26, the clamping device 32, and the welding transformers, the total of which can exceed 10,000 pounds (4540 kilograms).

Passing through the welding knee 10, above the lower support base 12, is a conveyor 18 by which workpieces 30 are transported to and from the welding knee 10. The workpieces 30 can be of any type which may undergo a welding operation on a production line, such as automobile door, hood and body panel assemblies. As transported to the welding knee 10, the workpieces 30 will consist of two or more subcomponents or subassemblies which are to be joined. The function of the welding knee 10 is to join the subcomponents or subassemblies by a welding operation while the workpieces 30 are pressed between the upper tooling 26 and lower tooling 24, as described below.

Located above the lower support base 12 and below the conveyor 18 is a movable platen or table 22. Supported upon the table 22 is the lower tooling 24 which is designed to mate with the upper tooling 26, both of which are chosen for use with the particular workpiece 30 being welded. The table 22 is designed to be actuated in a straight-line vertically between the lower support base 12 and the conveyor 18 by an appropriate straight-line lift mechanism 20. It is well known in the prior art to provide a motion generating device powered by an electric motor (not shown) for driving the lift mechanism 20 in a manner that initiates rapid movement from the lower support base 12, slows at a midpoint of travel near the conveyor to pick up the workpiece 20 from the conveyor and again accelerates from the midpoint to again slow down to a swell point near its highest point of travel near the upper tool 26. Such motion results in the lower tooling 24 being raised rapidly until it approaches the conveyor 18, at which time the lower tooling 24 lifts the workpiece 30 from the conveyor 18. The lower tooling 24 then continues to move rapidly upward until the workpiece 30 approaches the upper tooling 26, at which time it again decelerates to a dwell sufficiently so as not to abruptly engage the upper tooling 26 with the workpiece 30. With the workpiece 30 secured between the lower and upper tooling 24 and 26, the welding guns 28 weld the workpiece 30 to form a unitary member.

Figure 2:
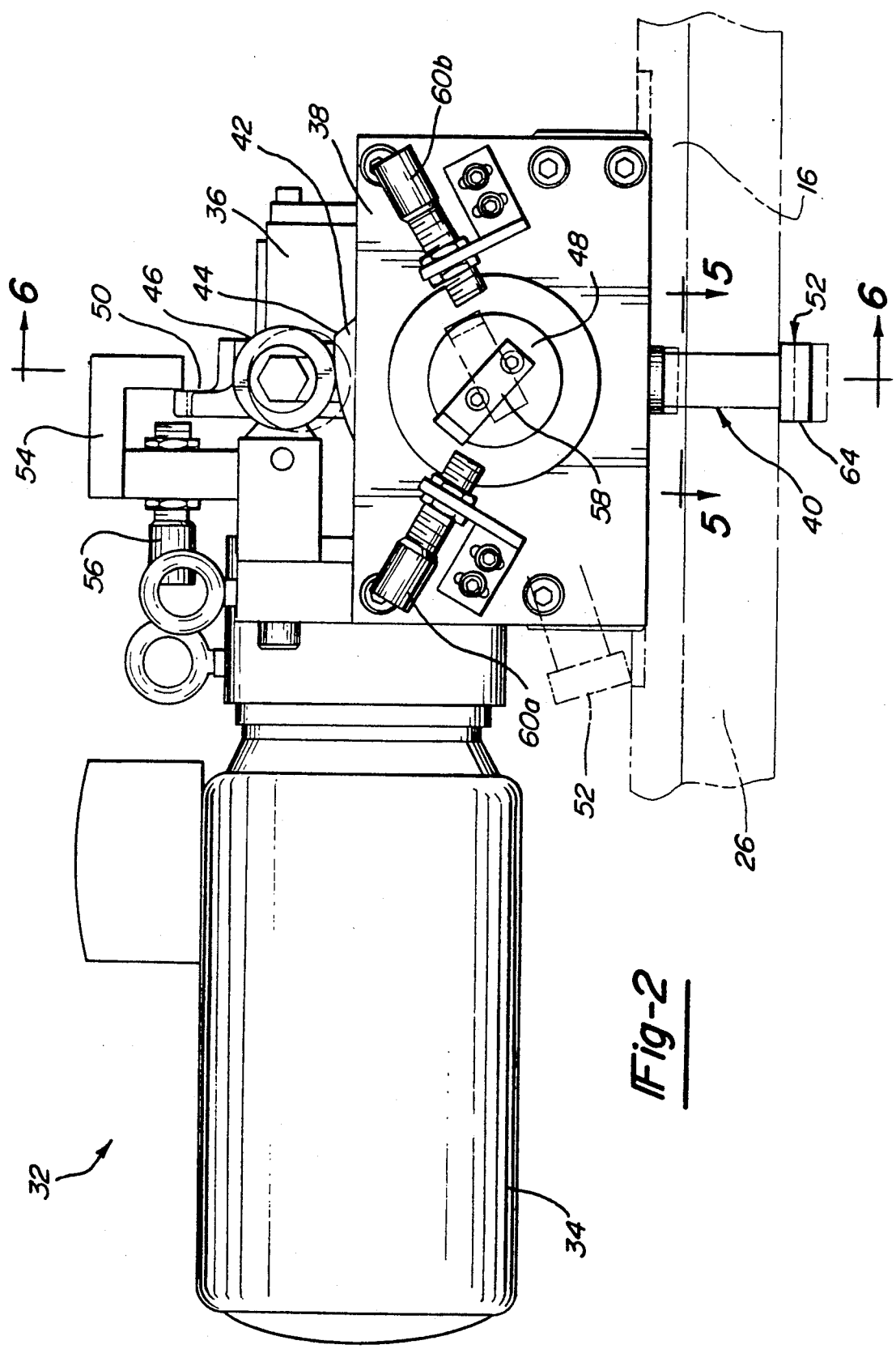
FIG. 2 is a front view of the clamping device in accordance with the preferred embodiment of this invention.
Figure 3:
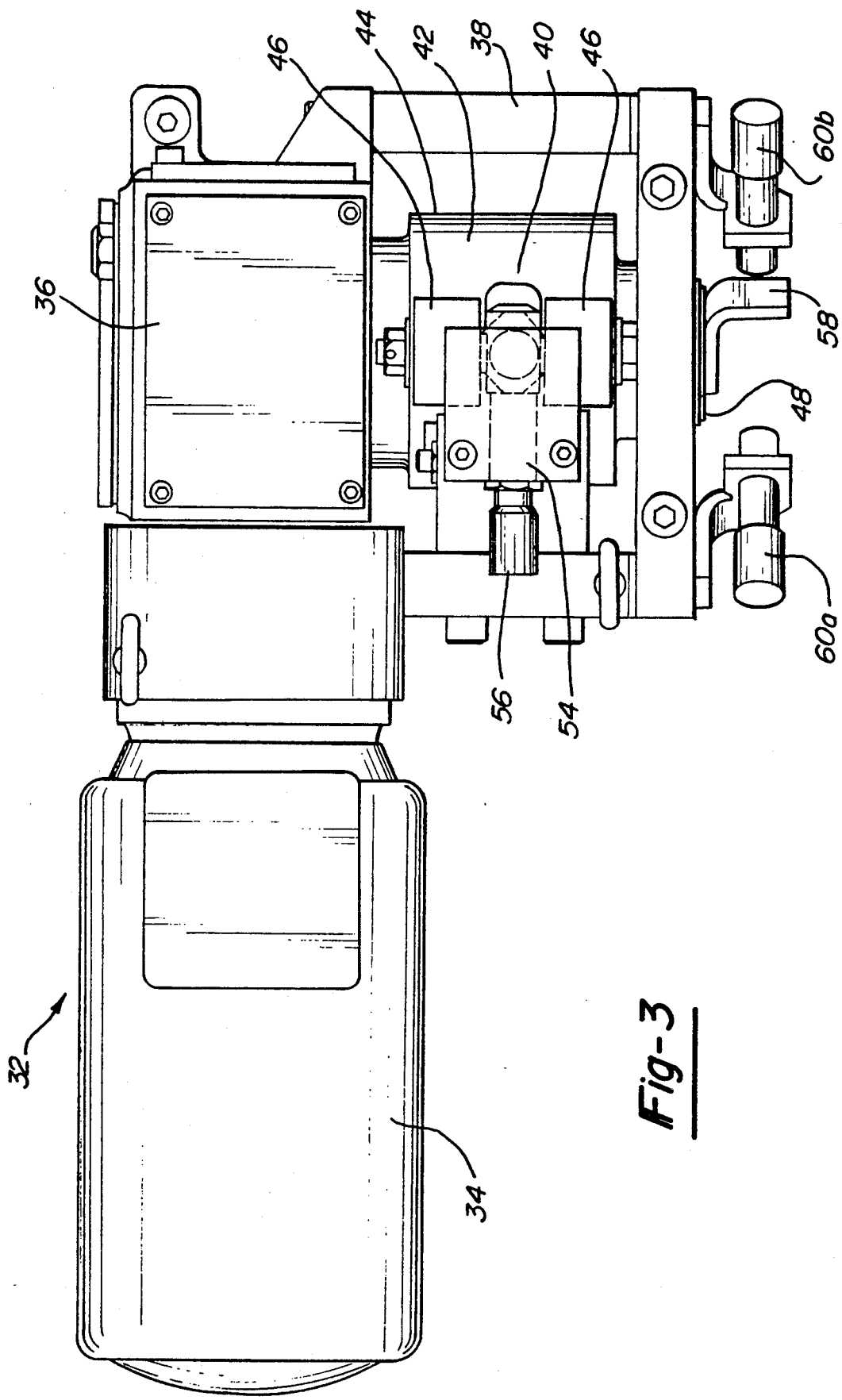
FIG. 3 is a top view of the clamping device of FIG. 2.
Figure 4:
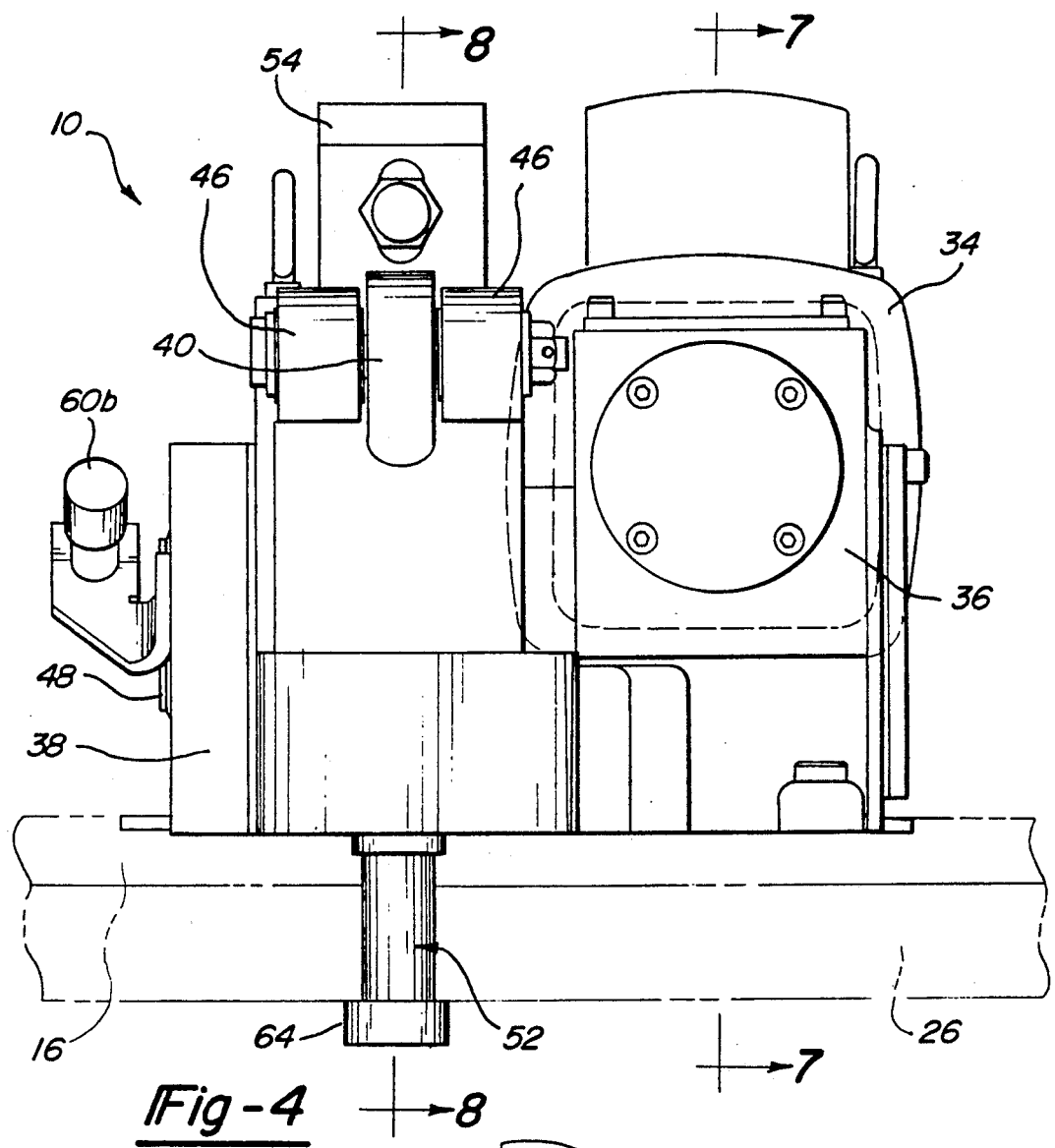
FIG. 4 is a side view of the clamping device of FIG. 2.

With reference now to FIGS. 2 through 9, there is shown a clamping device 32 according to the present invention. As can be seen in FIG. 2, the clamping device 32 is mounted to the upper workstation 16 directly above the upper tooling 26. The clamping device 32 is adapted to engage and secure the upper tooling 26 to the upper workstation 16 of the welding knee 10. In that the clamping device 32 is housed within the upper workstation 16, the clamping device 32 is able to engage, lift and secure the upper tooling 26 against the upper workstation 16 without the need for an operator to manually fasten the upper tooling 26 to the upper workstation 16. Though not of principal concern with the present teachings, it will also be readily appreciated by one skilled in the art that the clamping device 32 is also suitable for securing the lower tooling 24 to the table 22.

The clamping device 32 generally includes a motor 34, a gear housing 36 and a cam housing 38. The motor 34 is mounted directly to and in line with the gear housing 36, while the cam housing 38 is mounted to the gear housing 36 so as to be perpendicular to and offset below an axis defined by the motor 34 and the gear housing 36, as can be best seen in a top view of the clamping device 32 illustrated in FIG. 3. The motor 34 is preferably an electric motor adapted to produce maximum torque at minimum output speeds, as is well known in the art. Alternatively, the motor 34 can be a hydraulic motor, though not often favored on production assembly lines due to a concern for hydraulic leaks. The motor 34 is preferably controlled by electronic circuitry (not shown) which can synchronize the operation of a plurality of clamping devices 32 associated with a particular welding knee 10. Accordingly, the several clamping devices 32 can be simultaneously and synchronously operated to engage, align and secure the upper tooling 26 from a remote location. As will be described more fully below, the use of such circuitry also enables the incorporation of electronic safety devices, such as proximity sensors 56 and 60a and 60b, to ensure complete engagement and to prevent or detect erroneous disengagement from the upper tooling 26.

Figure 6:
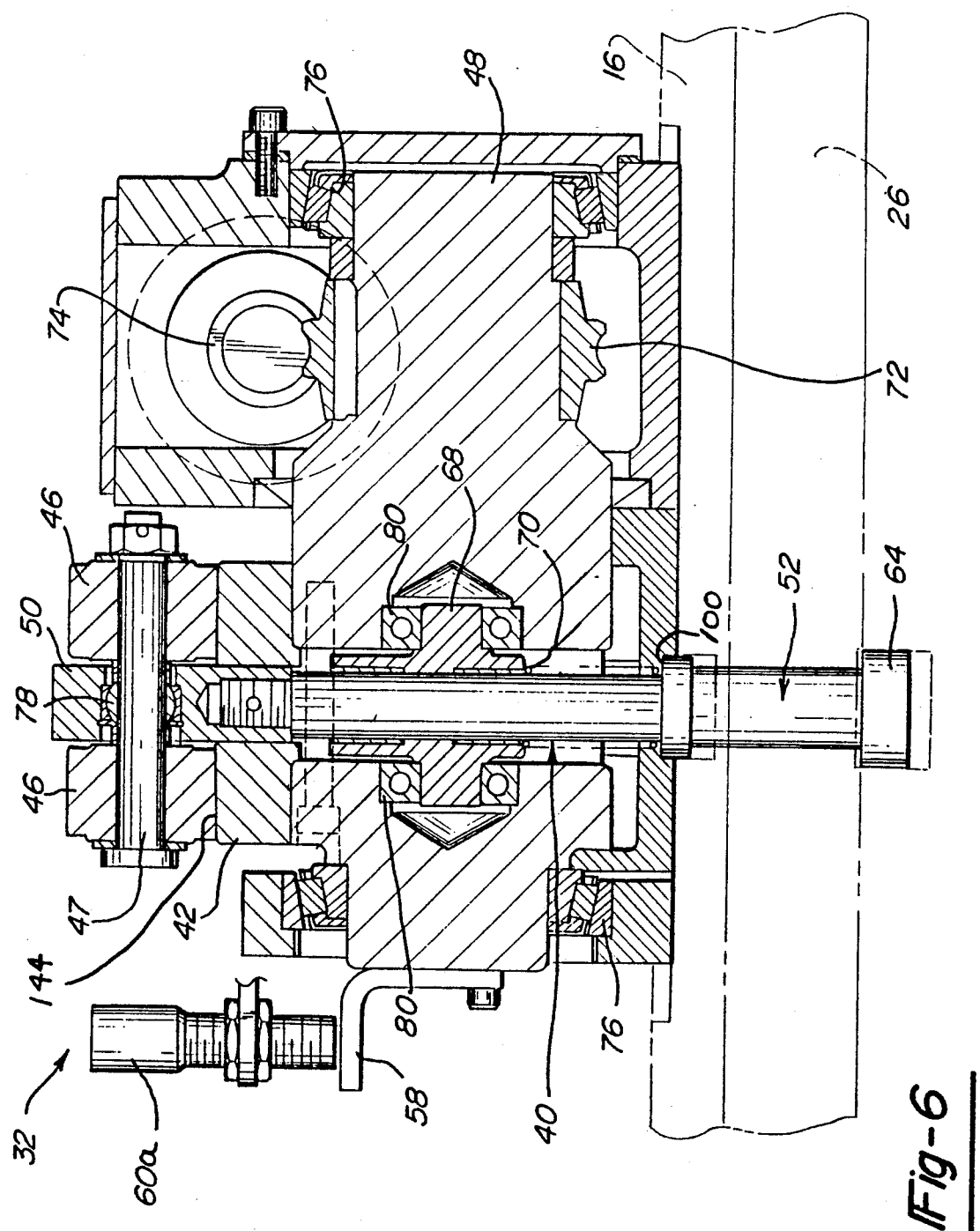
FIG. 6 is a cross-sectional view of the clamping device taken along line 6—6 of FIG. 2.
Figure 7:
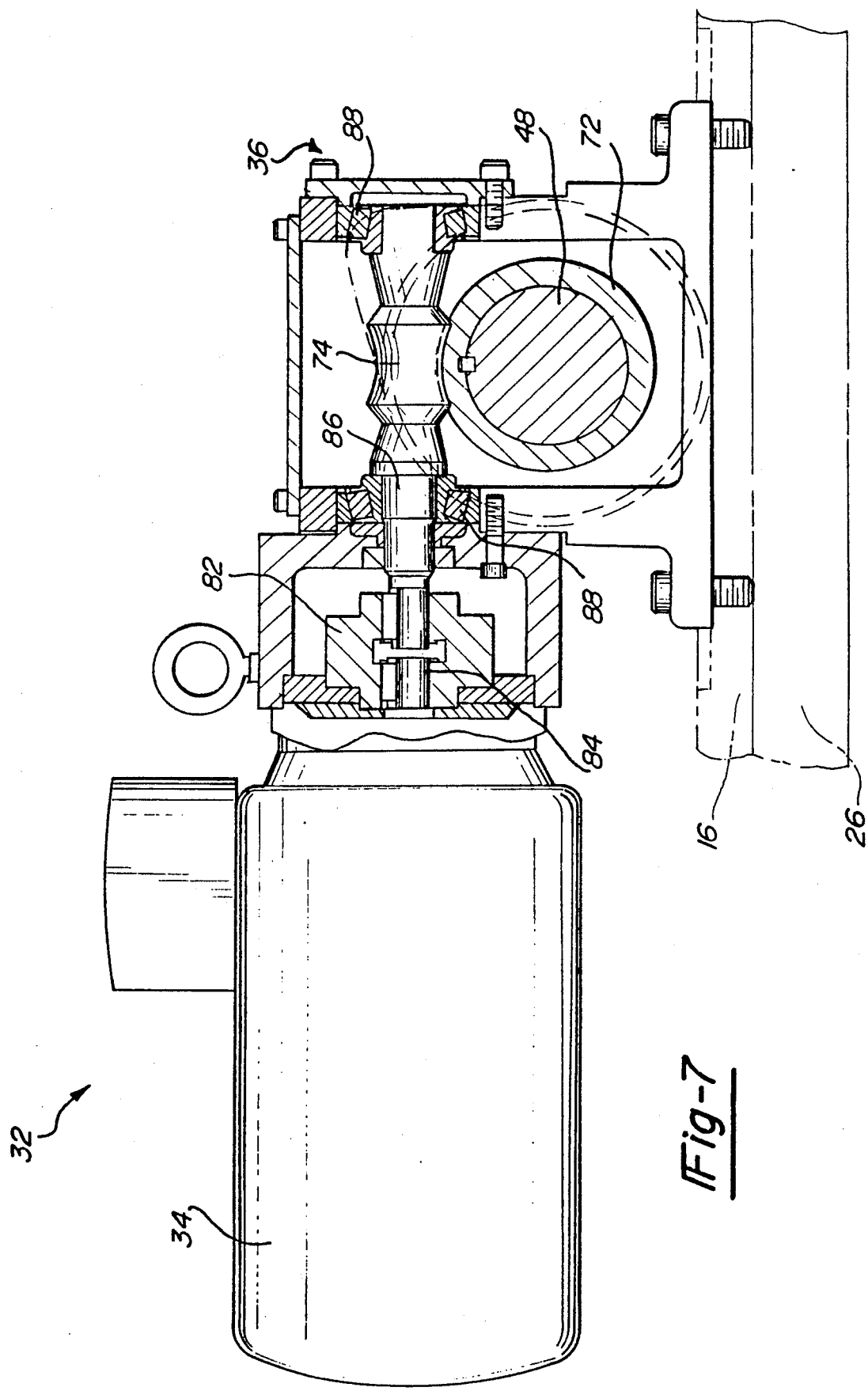
FIG. 7 is a cross-sectional view of the clamping device taken along line 7—7 of FIG. 4.

With reference to FIG. 7, the motor 34 has a drive shaft 84 which is connected with a coupling 82 to a worm gear shaft 86. The worm gear shaft 86 is supported on both ends by a pair of thrust bearings 88. Formed or mounted to the shaft 86 is a worm gear 74, which is entirely housed within the gear housing 36. The worm gear 74 is preferably a double enveloping worm gear to enhance its load-carrying capability. Meshed with the worm gear 74 is a spur gear 72 which is formed or mounted on a cam shaft 48. The cam shaft 48 is oriented perpendicular to the worm gear shaft 86 and is supported within both the gear housing 36 and the cam housing 38 by a pair of thrust bearings 76, as seen in FIG. 6. In the preferred embodiment, the speed ratio of the worm gear 74 is preferably 60:1 such that the rotational speed of the spur gear 72 is reduced by 1/60 as compared to the rotational speed of the worm gear 74. Accordingly, an output speed of 600 rpm from the motor 34 will produce a rate of rotation in the cam shaft 48 of 10 rpm. In addition, the ratio enables the worm gear arrangement 72 and 74 to resist an overrunning condition which is induced by the weight of the upper tooling 26 through the cam shaft 48.

As can be best seen in FIG. 2 and FIG. 6, an L-shaped pickup lever 58 is mounted to and projects from the front end of the cam shaft 48 which is opposite the spur gear 72. Positioned adjacent and on either side of the pickup lever 58 are the pair of proximity sensors 60a and 60b. The proximity sensors 60a and 60b provide feedback information to the previously noted motor control circuitry as to the position of the cam shaft 48 for purposes to be discussed hereinafter. In general, when the cam shaft 48 is rotated such that the pickup lever 58 is disposed adjacent one of the proximity sensors 60a or 60b, the proximity sensor 60a or 60b will detect the pickup lever's presence and relay this information to the appropriate circuitry. Accordingly, the control circuitry is aware of the rotational position of the cam shaft 48 in its extreme positions and can detect an error in its position, indicating a disengaged clamping device 32, for purposes of detecting potentially hazardous conditions.

Figure 5:
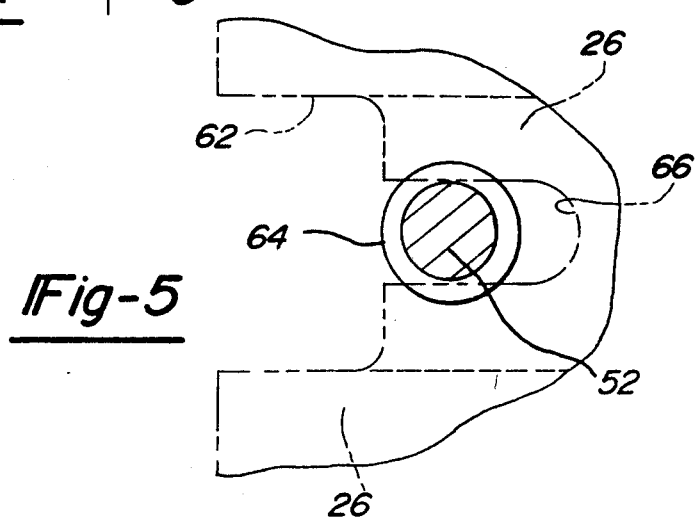
FIG. 5 is a cross-sectional view of the clamping lever and a corresponding T-slot in the upper tooling taken along line 5—5 of FIG. 2.
Figure 8A:
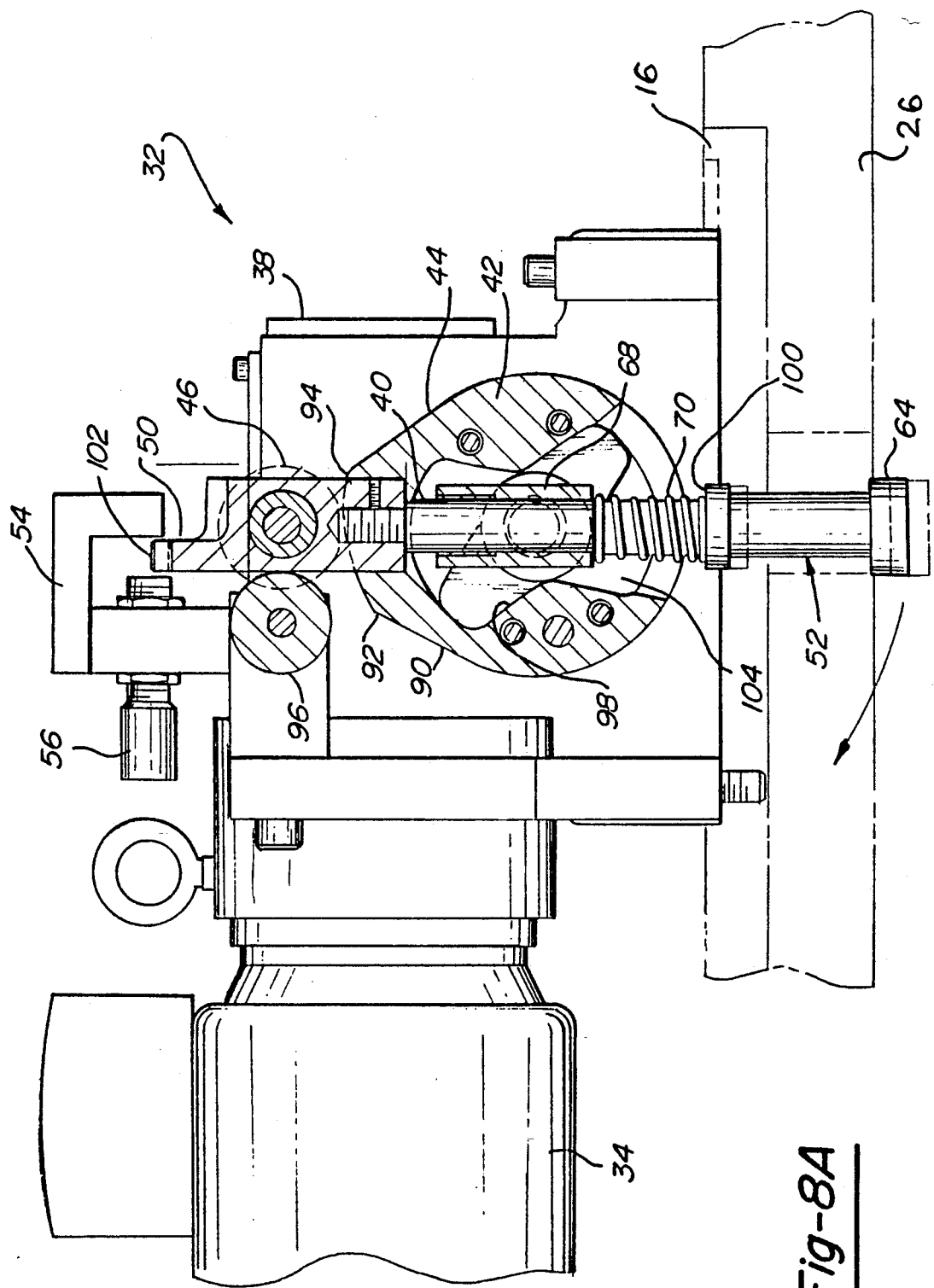
FIG. 8A is a cross-sectional view of the clamping device taken along line 8—8 of FIG. 4 in which the clamping lever is shown in an engaged position with the upper tooling.
Figure 8B:
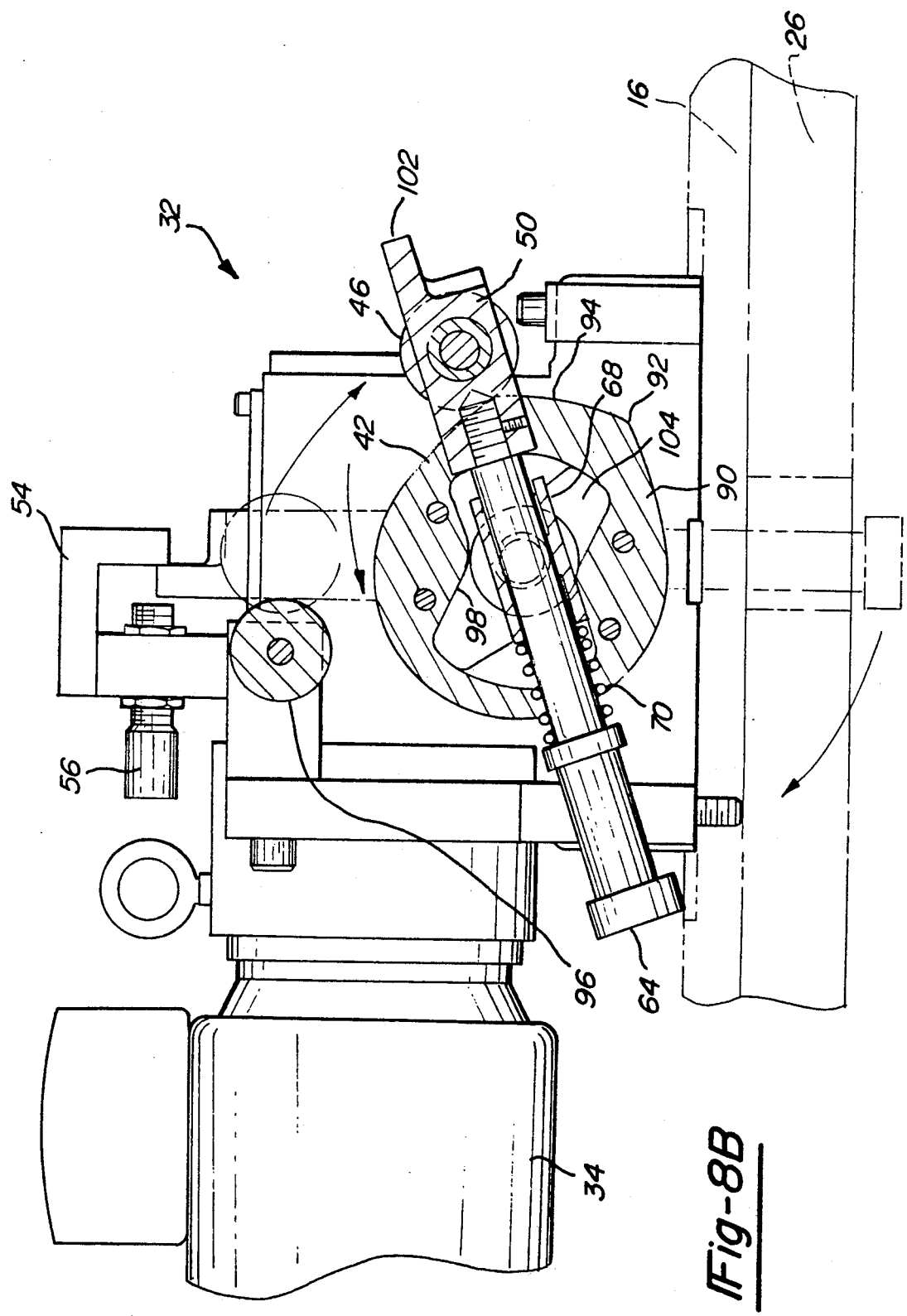
FIG. 8B is a cross-sectional view of the clamping device taken along line 8—8 of FIG. 4 in which the clamping lever is shown in a disengaged position with the upper tooling.

With reference now to FIGS. 6, 8A and 8B, a clamping lever 40 is pivotably mounted within the cam housing 38 and extends downwardly through the upper workstation 16 to engage the upper tooling 26 with its lower engagement end 52. The lower engagement end 52 has an enlarged end 64 which forms an inverted T. The T-shaped end 64 is sized to closely engage a corresponding slot 62 formed in the upper surface of the upper tooling 26, as shown in FIG. 5. The slot 62 acquires an inverted T-shape to match that of the T-shaped end 64 by way of a reduced portion 66. Accordingly, the T-shaped end 64 of the lower engagement end 52 can be rotated into the slot 62 from one side and become engaged with the T-shaped segment of the slot 62 at the reduced portion 66. The direction in which the lower engagement end 52 is rotated to engage the slot 62 is indicated by the phantom line of the lower engagement end 52 in FIG. 2.

With particular reference to FIGS. 8A, 8B and 6, the clamping lever 40 has an upper end 50 which projects above the cam housing 38. The upper end 50 is provided with a pair of rollers 46 which cam against a camming surface 44 formed on a cam 42 that is formed on or mounted to the cam shaft 48. The rollers 46 are mounted on either side of the upper end 50 with a pin 47 supported on a pair of bearings 78 to distribute the considerable load of the upper tooling 26 which the clamping lever 40 is required to engage and lift. The clamping lever 40 is slidably journalled within a bushing 68 intermediate the lower engagement end 52 and the upper end 50. The bushing 68 is pivotally mounted on a pair of bearings 80 within an hourglass-shaped slot 104 formed diametrically through the cam shaft 48. The bushing 68 provides the previously noted pivotable support for the clamping lever 40 within the cam housing 38. A compression spring 70 is disposed between the bushing 68 and a shoulder 100 formed on the clamping lever 40 and is biased to force the clamping lever 40 in a downward direction toward the upper tooling 26 to maintain rolling contact between the rollers 46 and the camming surface 44 of the cam 42.

FIGS. 8A and 8B illustrate the profile of the camming surface 44 and the relationship between the hourglass-shaped slot 104 and the clamping lever 40. In conjunction with the slot 104, the cam 42 serves to both rotate the clamping lever 40 and bushing 68 together and accommodate stroking of the clamping lever 40 within bushing 68. The camming surface 44 has a sloped contour 90 and a clamping contour 94 which are separated by a crest 92. The sloped contour 90 provides for the stroking of the clamping lever 40 within the bushing 68 while the clamping contour 94 causes a more gradual rise in the clamping lever that provides the clamping effect between the clamping device 40 and the upper tooling 26.

The operation of the clamping device 32 will serve to further describe the features of the clamping device 32 and relationships between the cam 42 and the clamping lever 40. FIG. 8A illustrates an engaged position in which the T-shaped end 64 of the clamping lever 40 is engaged with the slot 62 in the upper tooling 26, the rollers 46 are cammed against the clamping contour 94 of the camming surface 44, and the upper end 50 of the clamping lever 40 is abutted against a stop 96. In addition, the proximity sensor 60a detects the presence of the pickup lever 58 and relays this positional information to the appropriate control circuitry.

Upon the motor 34 being energized, the cam 42 is rotated in a clockwise direction, as best shown in FIGS. 8A and 8B, by the cam shaft 48 through the worm gear 74 and spur gear 72 arrangement. While the rollers 46 are biased against the clamping contour 94 of the cam 42, the clamping arm 40 is prevented from rotating by a lever restraint 54 which abuts a retaining flange 102 projecting from the upper end 50 of the clamping lever 40. The proximity sensor 56 serves to verify that the clamping lever 40 is in a vertical position. Other than a slight downward movement of the clamping lever 40 as the rollers 46 follow the clamping contour 94, no rotary movement is otherwise induced in the clamping lever 40 in that the clamping lever 40 is free to pivot with the bushing 68 within the hourglass-shaped slot 104.

However, once the rollers 46 traverse the crest 92 and begin camming against the sloped contour portion 90 of the camming surface 44, the clamping lever 40 begins to travel downward to disengage the lower engagement end 52 from the slot 62 in the upper tooling 26. The compressed spring 70 urges the clamping lever 40 downward during this disengagement stage to allow the lower engagement end 52 of the clamping lever 40 to unclamp the slot 62. The downward movement of the clamping lever 40 also serves to drop the retaining flange 102 of the clamping lever 40 below the lever restraint 54, allowing the clamping lever 40 to pivot. However, little movement in the clamping arm 40 will occur due to the friction resulting from the engagement of the T-shaped end 64 of the clamping lever 40 with the slot 62. This friction is overcome when, with further rotation of the cam 42, an abutment 98 formed by the hourglass-shaped slot 104 abuts the clamping lever 40 and forces it to rotate clockwise as viewed in FIG. 8A with the cam 42. As the cam 42 and clamping lever 40 rotate clockwise, the T-shaped end 64 is rotated out from the slot 62 to completely disengage the lower engagement end 52 of the clamping lever 40 with the upper tooling 26, as illustrated in FIG. 8B. Furthermore, the proximity sensor 60b as viewed in FIG. 1 relays to the control circuitry that the cam shaft 48 (and thus the clamping lever 40) is now in the disengaged position.

Operating in the reverse direction to engage the clamping lever 40 with the upper tooling 26, the motor 34 will be energized in the opposite direction to turn the cam shaft 48 and cam 42 in a counterclockwise direction. Starting from the disengaged position illustrated in FIG. 8B, the cam 42 will rotate with only the sloped contour portion 90 of the camming surface 44, in conjunction with the biasing force provided by the spring, serving as an abutment to rotate the clamping lever 40 with the cam 42. The clamping lever 40 will continue to rotate until vertical when its upper end 50 abuts the stop 96 and the T-shaped end 64 of the lower engagement end 52 becomes slidably engaged with the slot 62 in the upper tooling 26. Thereafter, the rollers 46 will be forced to traverse the sloped contour portion 90 and the crest 92 of the camming surface 44 to stroke the clamping arm 40 up through the bushing 68 against the biasing force of the compression spring 70. As a result, the T-shaped end 64 becomes fully engaged with the slot 62 and the retaining flange 102 moves behind the lever restraint 54. Furthermore, the proximity sensor 60a relays to the control circuitry that the cam shaft 48 (and thus the clamping lever 40) is now in the engaged position. The final segment of the cam rotation, in which the rollers 46 are forced to traverse the clamping contour 94 of the camming surface 44, creates the clamping load necessary to secure the upper tooling 26 to the upper workstation 16.

Since changes of the upper and lower tooling 26, 24 within the welding knee occur rather infrequently the clamping device 32 and associated motor 34 are expected to remain in an engaged mode, i.e., stall mode for the motor for long periods of time. Accordingly, the wedge surfaces as well as any metal-to-metal contact surfaces may develop a high resistance to movement after extensive long term engagement. Further, the motor, in order to provide the necessary high torque output during the clamping phase, must be designed to provide maximum output at stall conditions. To accomplish this feature the controls provide a control element in the form of a variable or fixed resistance or, in the alternative, and inductance coil, across the line voltage when the motor is energized to clamp the tooling. This feature is advantageously used for unclamping the tooling and overcoming the high resistance to movement that may exist after a long engagement period by removing the element, i.e. resistor, coil, across the line voltage and allowing the motor to operate at full voltage in the unclamping mode thereby providing maximum available torque to unclamp the clamping device and overcome all resistance to movement which may result from long term engagement.

Figure 9:
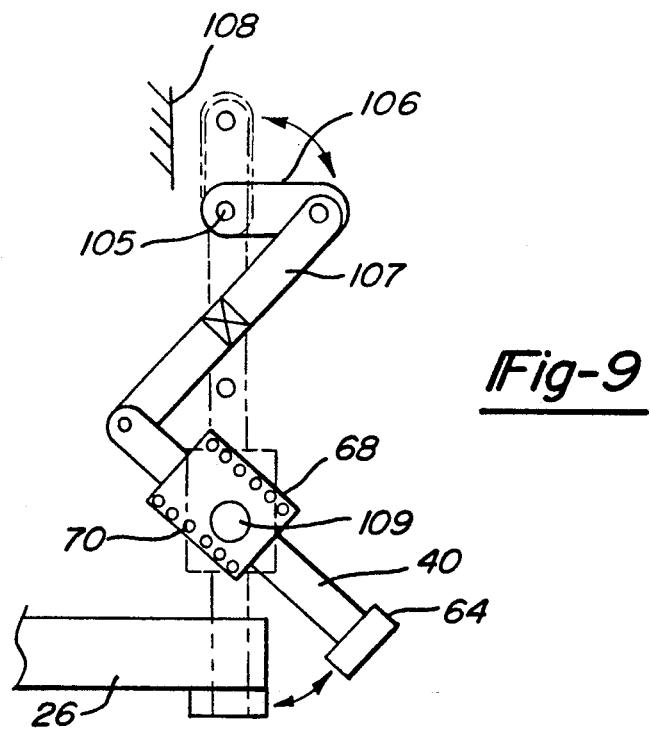
FIG. 9 illustrates a drive linkage mechanism for actuating and stroking the clamping lever of the clamping device in accordance with a second embodiment of this invention.

An alternative embodiment is illustrated in FIG. 9, in which the clamping lever 40 is actuated by a series of linkages. The rotational and stroking action induced in the clamping lever 40 is essential identical to that described above, and will not be repeated here. The linkage mechanism includes an eccentric crank 106 and an elastic link 107. The eccentric crank is pivotable about a fixed pivot 105. The elastic link 107 is pivotably connected to the eccentric crank 106 and the clamping lever 40, which itself is pivotable about a fixed pivot 109. The elastic link 107 is of a type known in the prior art, and provides an upward elastic tension as the clamping lever 40 engages and clamps the upper tooling 26.

As illustrated in the disengaged position, the clamping lever 40 is moved into the engaged position by rotating the eccentric crank 106 in a counterclockwise direction. The motion of the eccentric crank 106 acts first to swing the clamping lever 40 into engagement with the slot 62 in the upper tooling 26. Once in position, further rotation of the eccentric crank 106 strokes the clamping lever 40 upward until fully engaged with the upper tooling 26. Further rotation of the eccentric crank 106 causes the elastic link 107 to elastically extend to create a clamping load between the clamping lever 40 and the upper tooling 26. The eccentric crank 106 continues to rotate counterclockwise until it abuts an over-center stop 108, which ensures that the eccentric crank 106 is locked into position and will not be disengaged without being forced by an external force, such as the motor 34. Disengagement of the clamping lever 40 with the upper tooling 26 is essentially the reverse of the above-described sequence.

A significant advantage of the clamping device 32 of the present invention is that one or more clamping devices 32 is mounted directly to the upper workstation 16 of the welding knee 10 so as to be in position to engage and secure the upper tooling 26. After lifting the upper tooling 26 toward the upper workstation 16 in a conventional manner, such as with a fork lift or conveyor (not shown), the clamping devices 32 can be synchronously operated, through appropriate circuitry controlling the motor 34, to engage, lift and secure the upper tooling 26. Accordingly, the manpower-intensive labor required by the prior art is avoided, while simultaneously improving the safety of the installation operation.

Moreover, the clamping devices 32 can be positioned to accurately engage and lift the upper tooling 26 into a secured position that is properly aligned with the lower tooling 24 on the table 22 of the welding knee 10. The slot 62 can be precisely located as a datum in the upper tooling 26 such that, as the clamping lever 40 is rotated into position, the lower engagement end 52 of the clamping lever 40 positively engages the slot 62 of the upper tooling 26 and accurately aligns the upper tooling 26 with the lower tooling 24.

Another significant advantage of the present invention is that the cam 42 is motor driven to provide precise control of the motion of the clamping lever 40. Thus, several clamping devices 32 can be controlled to operate in a sequential or simultaneous manner. With suitable control circuitry utilizing the feedback information provided by the proximity sensors 56 and 60a and 60b, the motor 34 can be appropriately energized or de-energized according to the detected position of the clamping lever 40 to ensure its proper operation and engagement with the upper tooling 26. As a result, the proximity sensors 56 and 60a and 60b serve as emergency overrides and stops to prevent dangerous conditions such as damaged or disengaged clamping levers 40.

While the invention has been described in terms of a preferred embodiment, it is apparent that other forms could be adopted by one skilled in the art. Accordingly, the scope of the invention is to be limited only by the following claims.

What is claimed is:

1. A clamping device for clamping a workpiece, said clamping device comprising:
   a clamping member having an engagement portion and a journalling portion;
   bushing means slidably supporting said clamping member at said journalling portion; and
   means for sequentially rotating said clamping member and said bushing means and stroking said clamping member within said bushing means such that said clamping member is rotated during a positioning stage and such that said clamping member is stroked within said bushing means to engage said engagement portion with said workpiece during an engagement stage.

2. The clamping device of claim 1 wherein said means for sequentially rotating and stroking comprises:
an elastic link pivotably connected to said clamping member;
an eccentric crank pivotably connected to said elastic link, said eccentric crank adapted to rotate said clamping member during said positioning stage and stroke said clamping member within said bushing means during said engagement stage; and
drive means for rotating said eccentric crank.

3. The clamping device of claim 1 wherein said means for sequentially rotating and stroking comprises:
camming means pivotably connected to said bushing means, said camming means engaging said clamping member for stroking said clamping member within said bushing means;
abutment means associated with said camming means for abutting and rotating said clamping member during said positioning stage; and
drive means for rotating said camming means.

4. The clamping device of claim 3 wherein said drive means comprises:
an electric motor having a drive shaft;
a worm gear driven by said drive shaft;
a gear meshed with said worm gear; and
a shaft interconnecting said gear with said camming means, said shaft defining an axis of rotation for said camming means.

5. The clamping device of claim 4 wherein said camming means comprises a camming surface engaging said clamping member, said camming means being radially spaced from said axis of rotation.

6. The clamping device of claim 3 wherein said abutment means is a slot integrally formed on said camming means.

7. The clamping device of claim 1 further comprising means for biasing said clamping member to prevent engagement of said engagement portion with said workpiece during said positioning stage.

8. A clamping device for clamping a workpiece, said clamping device comprising:
a clamping member having an engagement portion, a journalling portion, and a rolling portion;
bushing means slidably supporting said clamping member at said journalling portion;
camming means pivotably connected to said bushing means, said camming means having a camming surface engaging said rolling portion of said clamping member, said camming surface stroking said clamping member within said bushing means to engage said engagement portion with said workpiece during an engagement stage;
abutment means associated with said camming means for abutting and rotating said clamping member and bushing means during a positioning stage;
drive means for rotating said camming means; and
means for biasing said clamping member to maintain engagement of said rolling portion with said camming surface.

9. The clamping device of claim 8 wherein said camming surface comprises a sloped portion for stroking said engagement portion into engagement with said workpiece during said engagement stage and a clamping portion for gradually clamping said workpiece during said engagement stage.

10. The clamping device of claim 9 wherein said abutment means is a slot integrally formed on said camming means adjacent said sloped portion of said camming surface.

11. The clamping device of claim 9 wherein said rolling portion of said clamping member cams against said sloped portion of said camming surface during said positioning stage and traverses said sloped portion and said clamping portion, respectively, during said engagement stage, said positioning stage and said engagement stage occurring during a first direction of cam rotation, and wherein said rolling portion traverses said clamping portion and said sloped portion, respectively, during a disengagement stage, and abuts said abutment means during a repositioning stage, said repositioning stage and said disengagement stage occurring during an opposite direction of cam rotation.

12. The clamping device of claim 11 further comprising means for restraining said clamping member while said rolling portion is traversing said clamping portion during said disengagement stage.

13. The clamping device of claim 8 wherein said camming means comprises at least one disc-shaped cam, said camming surface being disposed on a circumferential surface of said at least one disc-shaped cam.

14. The clamping device of claim 13 further comprising a slot integrally formed in said camming means, said abutment means being formed by said slot adjacent said sloped portion of said camming surface.

15. The clamping device of claim 8 wherein said means for biasing biases said clamping member toward said workpiece during said positioning stroke.

16. The clamping device of claim 8 wherein said drive means comprises:
an electric motor having a drive shaft;
a worm gear driven by said drive shaft;
a gear meshed with said worm gear; and
a shaft interconnecting said gear with said camming means.

17. The clamping device of claim 16 wherein said worm gear is a high ratio worm gear to resist overrunning loads induced by said workpiece on said gear through said camming means.

18. The clamping device of claim 8 further comprising means for sensing the rotational position of said camming means.

19. The clamping device of claim 8 wherein said rolling portion of said clamping member comprises a roller rotatably attached to said clamping member opposite said engagement portion.

20. The clamping device of claim 8 wherein said means for biasing is a spring disposed within said bushing means.

21. The clamping device of claim 8 further comprising a housing, wherein said camming means is rotatably supported within said housing and said clamping member projects outside of said housing for engagement with said workpiece.

22. The clamping device of claim 1 wherein said means for sequentially rotating said clamping member further comprises:
a motor having output means attached to said clamping means for rotating said clamping member; and
means for controlling said motor integrally attached to said motor for providing torque output at a stall mode as well as maximum torque output at maximum full operating mode.

* * * * *

UNITED STATES PATENT AND TRADEMARK OFFICE
CERTIFICATE OF CORRECTION

PATENT NO. : 5,174,489
DATED : December 29, 1992
INVENTOR(S) : Arthur C. Mason

It is certified that error appears in the above-identified patent and that said Letters Patent is hereby corrected as shown below:

Column 3, line 56, delete "work station" and insert ---- workstation ----.

Column 3, line 57, delete "work station" and insert ---- workstation ----.

Column 4, line 10, delete "work station" and insert ---- workstation ----.

Column 4, lines 20 and 21, delete "work station" and insert ---- workstation ----.

Column 5, line 3, delete "insertion" and insert ---- invention ----.

Column 5, line 7, delete "work station" and insert ---- workstation ----.

Column 5, line 24, delete "process" and insert ---- processed ----.

Column 5, line 61, delete "20" and insert ---- 30 ----.

Column 5, line 63, delete "swell" and insert ---- dwell ----.

Column 5, line 64, delete "tool" and insert ---- tooling ----.

Column 6, line 55, before "shaft" insert ---- worm gear ----.

UNITED STATES PATENT AND TRADEMARK OFFICE
CERTIFICATE OF CORRECTION

PATENT NO. : 5,174,489

DATED : December 29, 1992

INVENTOR(S) : Arthur C. Mason

It is certified that error appears in the above-identified patent and that said Letters Patent is hereby corrected as shown below:

Column 8, line 29, delete "arm" and insert ---- lever ----.

Column 8, line 44, delete "compressed" and insert ---- compression ----.

Column 9, line 15, delete "arm" and insert ---- lever ----.

Column 9, line 27, delete "26, 24" and insert ---- 26 and 24 ----.

Column 9, line 40, delete "and" and insert ---- an ----.

Column 9, line 54, delete "essential" and insert ---- essentially ----.

Column 12, line 34, delete "stroke" and insert ---- stage ----.

Column 12, line 61, delete "1" and insert ---- 3 ----.

Column 12, line 64, delete "clamp-" and insert ---- camming ----.

UNITED STATES PATENT AND TRADEMARK OFFICE
CERTIFICATE OF CORRECTION

PATENT NO. : 5,174,489

DATED : December 29, 1992

INVENTOR(S) : Arthur C. Mason

It is certified that error appears in the above-identified patent and that said Letters Patent is hereby corrected as shown below:

Column 12, line 65, delete "ing".

Signed and Sealed this

Second Day of November, 1993

Attest:

BRUCE LEHMAN

Attesting Officer

Commissioner of Patents and Trademarks